United States Patent
Schad

[19]

[11] Patent Number: 5,769,021
[45] Date of Patent: Jun. 23, 1998

[54] AMPHIBIOUS CRAFT

[76] Inventor: Robert D. Schad, 110 Bloor St. W., Suite 2104, Toronto, Ontario, Canada

[21] Appl. No.: 815,962

[22] Filed: Mar. 13, 1997

Related U.S. Application Data

[63] Continuation of Ser. No. 534,381, Sep. 28, 1995, abandoned.

[51] Int. Cl.$^6$ .................................................. B63H 7/00
[52] U.S. Cl. ............................. 114/270; 114/43; 440/37
[58] Field of Search ............................. 440/37; 114/43, 114/344, 270, 150; 188/18 A, 8

[56] References Cited

U.S. PATENT DOCUMENTS

| | | | |
|---|---|---|---|
| 1,816,118 | 7/1931 | Knight | 114/43 |
| 2,278,255 | 3/1942 | Grabbe | 114/270 |
| 2,350,037 | 5/1944 | Hofheins et al. | 114/270 |
| 2,617,139 | 11/1952 | Bittel | 114/344 |
| 2,787,235 | 4/1957 | Schroeder | 114/150 |
| 2,863,159 | 12/1958 | Bear | 114/344 |
| 3,057,319 | 10/1962 | Wagner | 114/270 |
| 3,158,881 | 12/1964 | Clausen | 114/344 |
| 3,421,472 | 1/1969 | Oberg | 114/270 |
| 3,740,075 | 6/1973 | Soehnlen | 114/344 |
| 3,774,933 | 11/1973 | Asberg | 188/18 A |
| 3,831,211 | 8/1974 | Bustamante | 114/344 |
| 4,256,319 | 3/1981 | Winter | 188/8 |
| 4,669,408 | 6/1987 | Schad | 114/43 |
| 4,821,663 | 4/1989 | Schad | 114/43 |
| 5,632,221 | 5/1997 | Trenne et al. | 114/344 |

OTHER PUBLICATIONS

Popular Mechanics, "Aquastrada", Nov. 1994, pp. 77 and 78.

*Primary Examiner*—Sherman Basinger
*Attorney, Agent, or Firm*—Bachman & LaPointe, P.C.

[57] ABSTRACT

An amphibious craft having a plurality of independent surface engaging elements each one of which provides a load bearing function when in contact with a support surface.

17 Claims, 9 Drawing Sheets

AMPHIBIOUS CRAFT

This is a Continuation, of application Ser. No. 08/534,381, filed Sep. 28, 1995 and now abandoned.

BACKGROUND OF THE INVENTION

The present invention relates to highly maneuverable amphibious craft useful to transport cargo and personnel over a wide variety of support surfaces such as open ocean and inland waters, rough seas, ice, rotten ice, slush, snow, swamps, mud, short spans of lowland, ships wakes, arctic growlers, bare land, beaches and launching ramps for pleasure, rescue and military purposes.

Thus it is a prime feature of the present invention to provide an amphibious craft which is capable of progress over a wide variety of surfaces powered by an air fan or an air propeller.

Depending upon the support surface encountered, the hull makes direct surface contact or the hull is elevated free of contact by projection of fore and aft wheel sets which then assume the load bearing function.

The present invention is an improvement over prior art hull structures such as are disclosed in U.S. Pat. Nos. 4,669,408 and 4,821,663.

While the above prior art crafts have a measure of utility when progressing over open water or over water in various congealed forms, they are difficult if not impossible to maneuver over beaches, launching ramps, bare land and roadways.

In addition, the prior art crafts generate highly unpleasant noise levels including considerable vibration when proceeding over hard crusty surfaces such as bare land, ice or ice encrusted snow.

While the '663 reference shows, in one embodiment, retractable wheels for transport or towing, note that these wheels retract into hull sockets or recesses which interrupt the continuity of the hull and introduce undue friction or drag when the craft is operating in open water.

SUMMARY OF THE INVENTION

In contrast, the craft of the present invention includes a hull portion which at the water line or when planing in open water presents a smooth continuous uninterrupted contour to the support surface.

Wheel sets at the bow and at the stern of the craft, in their retracted position, are positioned well above the water line so that there is no break in the continuity of the load supporting hull portion at harbor speeds and during planing.

The bow wheel set is nested in a contoured well which is watertight and blends smoothly with the exterior of the main body of the hull.

Consequently, the present invention provides a craft, a portion of whose hull is continuous, uninterrupted and defines a primary surface engaging means (primary mode) and a secondary surface engaging means (secondary mode) in the form of fore and aft wheel sets.

The wheel sets are operable selectively and in unison to transfer the load bearing function from a portion of the hull to the fore and aft wheel sets when surfaces suitable for progress via wheels is indicated.

As stated earlier, the craft of the present invention is driven by an air fan or air propeller, suitably powered, in both the primary and secondary surface engaging modes. Obviously, the air fan is mounted well above the water line and is a "push" propeller well known in aircraft. In the alternative, a "pull" or a variable pitch propeller can be used.

While the fore and aft wheel sets are normally operated in unison, means can be provided for projecting the rear wheel set independently of the forward set making it convenient to tow the craft by making a suitable towing hitch to the raised bow of the craft while the rear wheel set simulates a boat trailer.

For purposes of claiming the invention, a portion of the hull is referred to as a first load bearing means, the stern wheel set as a second load bearing means and the forward wheel set as a third load bearing means. Note that the second and third load bearing means operating together define the secondary surface engaging means.

The language "wheel set" is intended to denote one or two wheels in a given set.

The air fan is provided with a rudder downstream of the air fan which provides the steering means when the craft is in the primary surface engaging mode, i.e. fore and aft wheel sets up.

When in the secondary surface engaging mode (bow and stern wheels down), it is preferred to steer the craft by a combination of the air rudder and the forward wheel set by applying power to the forward wheel set in the fashion of "power steering" appropriately synchronized with the movement of the rudder.

In the alternative, the forward wheel set may be mounted in a swivel as in a castor so that the steering function is solely under control of the air rudder.

A further feature of the invention is the provision of brakes in both the primary and secondary modes of operation.

Most useful in the primary mode, the hull, preferably at its stern, is provided with a hydraulically actuated ice brake in the form of a plate fitted with studs that engage the ice to slow and/or stop progress.

Figures 1, 2:
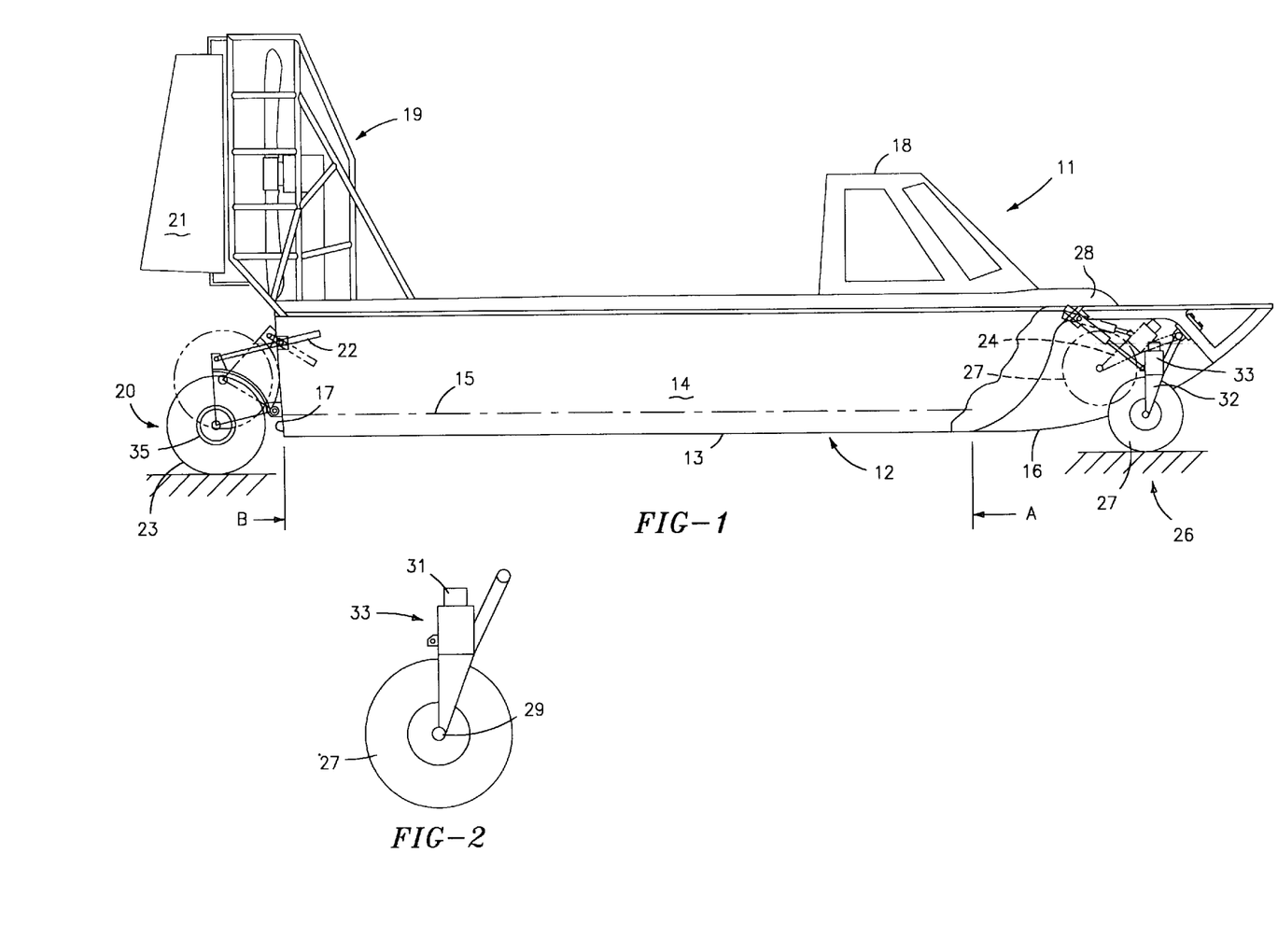
FIG. 1 is a side elevation of an amphibious craft disclosing features of the present invention.
FIG. 2 is an illustration of a typical caster mounting.
Figure 1A:
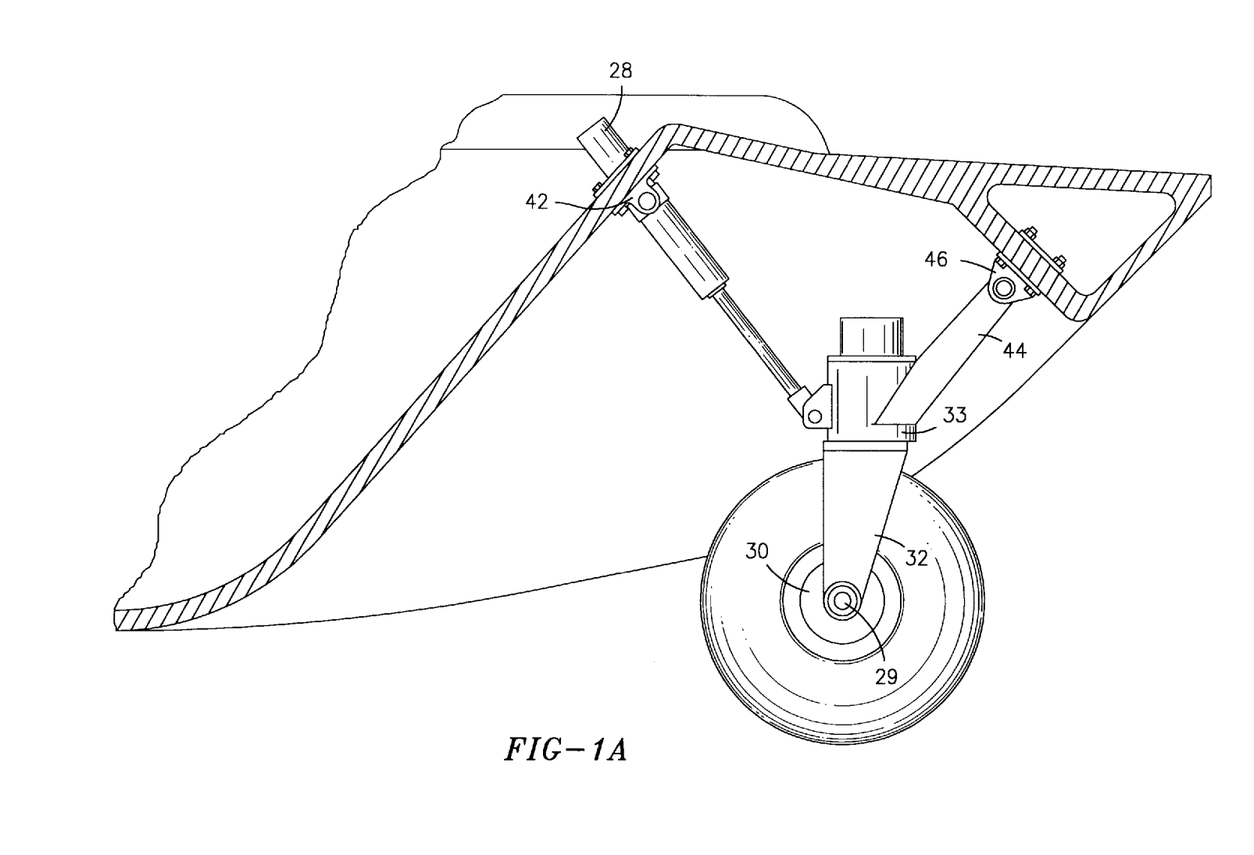
FIG. 1A is a detailed drawing of portions of FIG. 1.

In the secondary mode one or more wheel sets are provided with disc brakes as in FIG. 1A or brake bands as in FIG. 1 to effect the braking function.

A further feature of the invention is the substantial reduction of cabin noise and vibration especially when the craft is progressing in the secondary mode and the hull is free of contact with a support surface. In this mode, the hydraulic actuators and the tires absorb shock and provide a smooth ride.

The secondary mode is the most fuel efficient in view of minimum friction and drag.

An amphibious craft embracing certain features of the invention may comprise a hull, a continuous, unitary hull portion defining a primary surface engaging means, said primary surface engaging means further defining a first load bearing means, a secondary surface engaging means carried by said craft, said secondary surface engaging means further defining a second independent load bearing means, and power means for moving said second load bearing means relative to said first load bearing means effective to change the load bearing function selectively without violating the integrity or the continuity of said hull portion.

Other features and advantages of the present invention will become more apparent from an examination of the succeeding specification when read in conjunction with the appended drawings, in which

DETAILED DESCRIPTION OF THE PREFERRED EMBODIMENT

Figure 3:
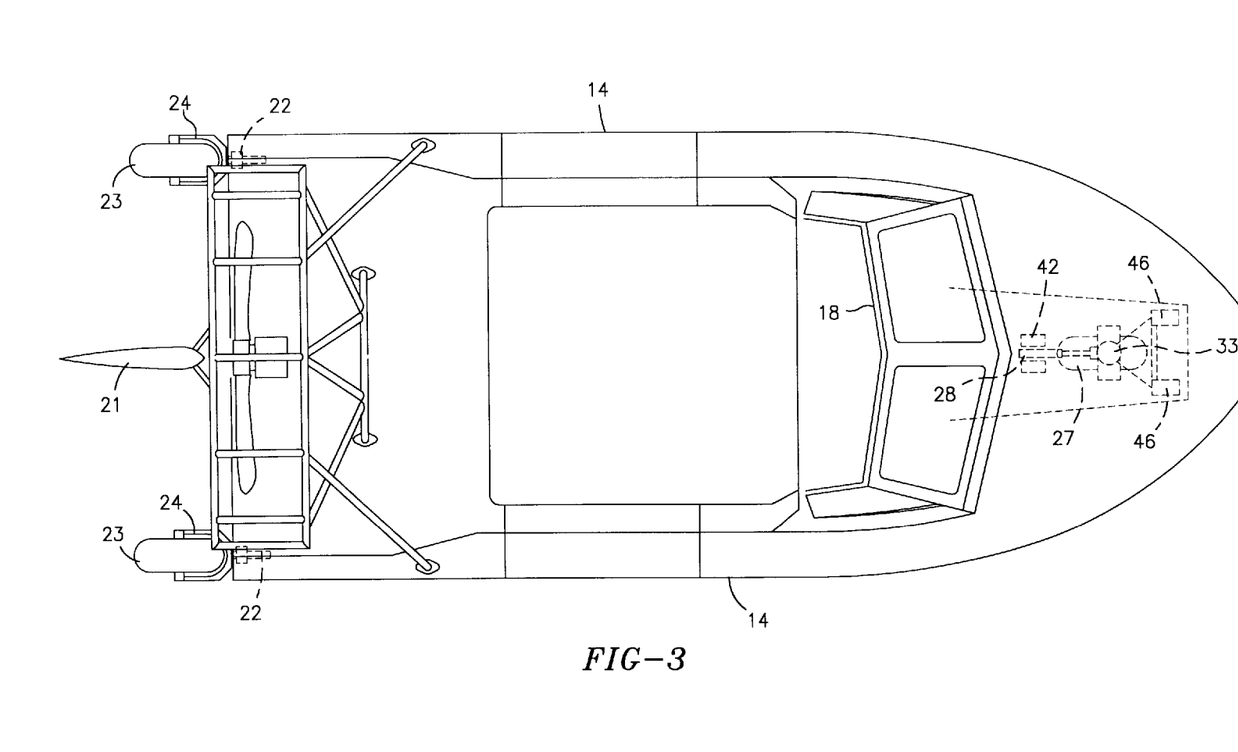
FIG. 3 is a top plan view of the showing of FIG. 1.

Referring to FIGS. 1, 2, and 3, the reference numeral 11 denotes the amphibious craft generally having a hull 12 including a generally planar first surface engaging portion or skin 13 contiguous with sidewall portions 14 and bow and stern portions 16 and 17, respectively, in a unitary arrangement.

The first or primary surface engaging portion 13 is further defined as an independent first load bearing structure extending generally through the hull span labelled A-B. The broken line indicated by the reference numeral 15 designates the hull waterline.

The hull includes a cabin and windscreen structure 18 and, in the embodiment disclosed, the craft is powered by a fan type air screw 19 driven by a suitable engine (not shown), in well known fashion, including a rudder 21.

It is to be noted that the craft may be advanced by an alternative jet stream such as provided by an aircraft engine or by an internal combustion engine, as desired.

There is a secondary surface engaging means, indicated generally by the reference numerals 20 at the stern and 26 at the bow. The stern unit includes a pair of load bearing wheels (stern wheel set) 23 each mounted to a movable yoke member 24 so that the wheel set is retractable from a solid line surface engaging load bearing position to a rest position designated by dashed lines under control of hydraulic rams 22.

The secondary surface engaging means includes a forward load bearing wheel (forward wheel set) 27 which is retractable from a solid line surface engaging position to a dotted line position under control of a single hydraulic ram 28.

It is preferred that the forward wheel 27 comprise a castored wheel such as is shown in FIG. 2 having a horizontal axis component 29, a vertical axis component 31 connected to a yoke 32. The wheel 27 is rotated about vertical axis 31 by a power steering unit 33.

Figure 4:
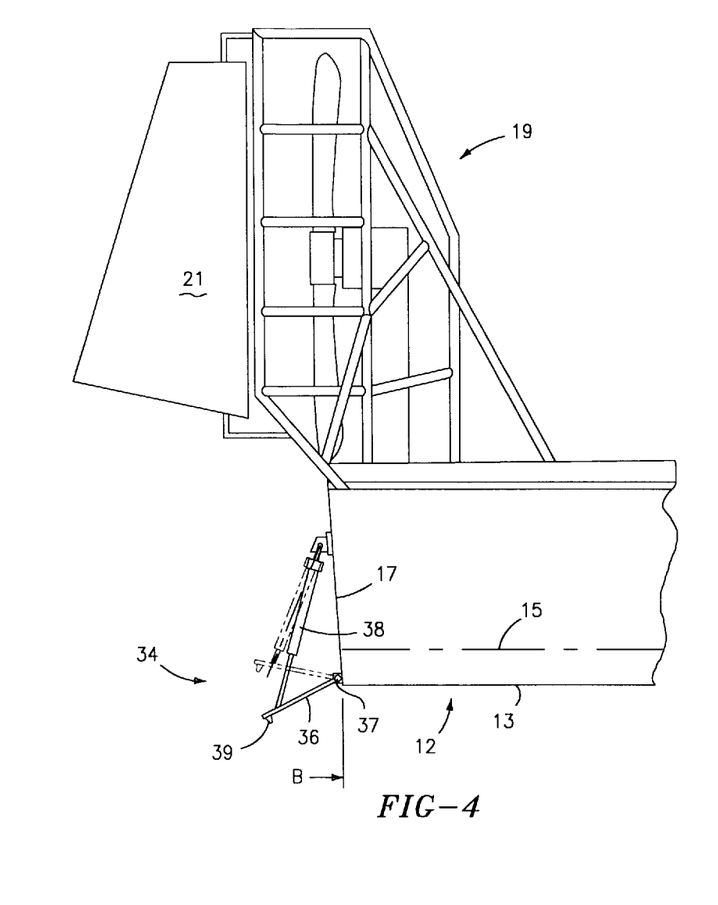
FIG. 4 is a side elevation of a portion of FIG. 1 with the stern wheel set removed to show an ice brake.
Figure 5:
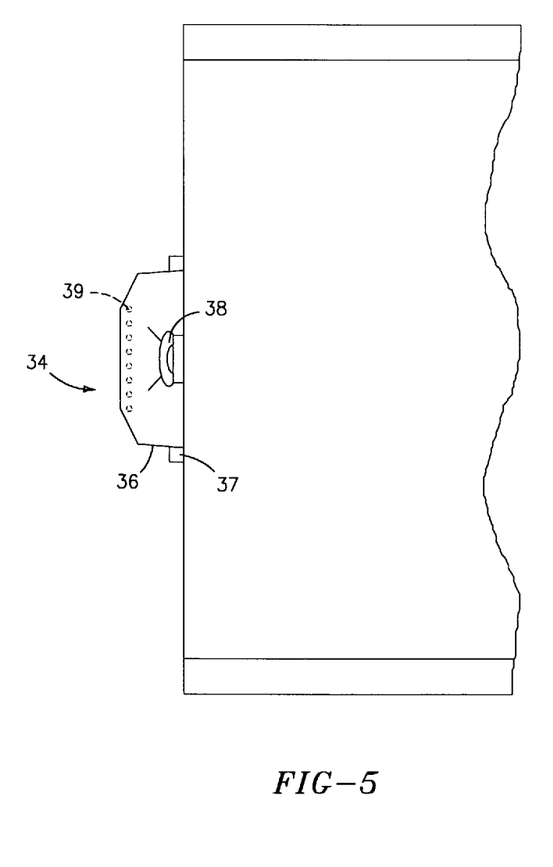
FIG. 5 is a plan view of FIG. 4 further showing the ice brake.

FIGS. 4 and 5 show details of an ice brake indicated generally by the reference numeral 34 with the stern wheel set removed for clarity.

The ice brake includes a plate 36, hinge pin 37 fixed to the stern 17 and is rotated about hinge pin 37 by ram 38. The plate 36 carries ice engaging lugs or claws 39 and is movable from a retracted position shown in dotted lines to an operative position shown in solid lines.

Figure 6:
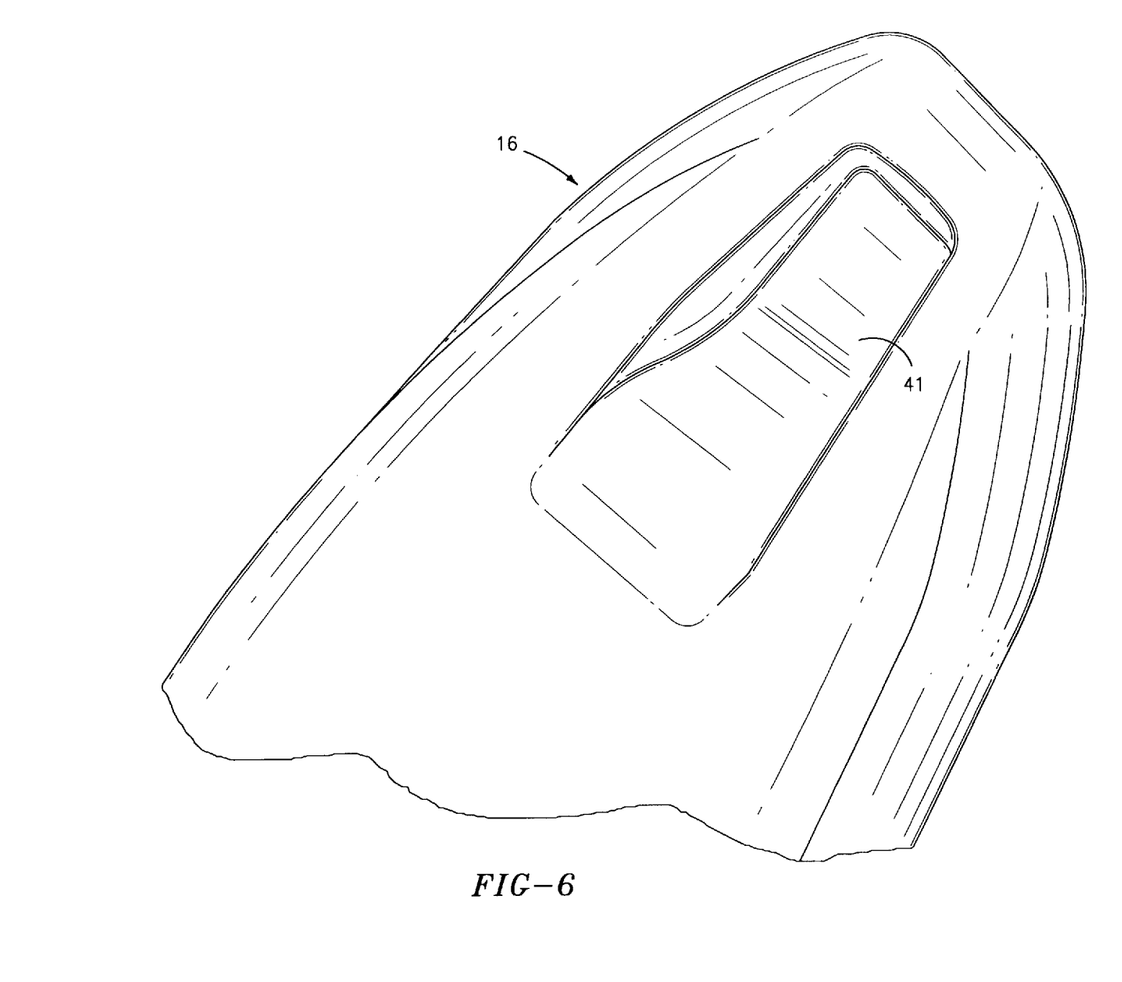
FIG. 6 is a bottom view, in perspective, of the bow portion of the craft showing the profile of the well for receiving the forward wheel set.

FIG. 6 is a perspective of the bottom side of the bow portion of the craft showing a wheel well 41 for receiving forward wheel set 26.

Figure 7:
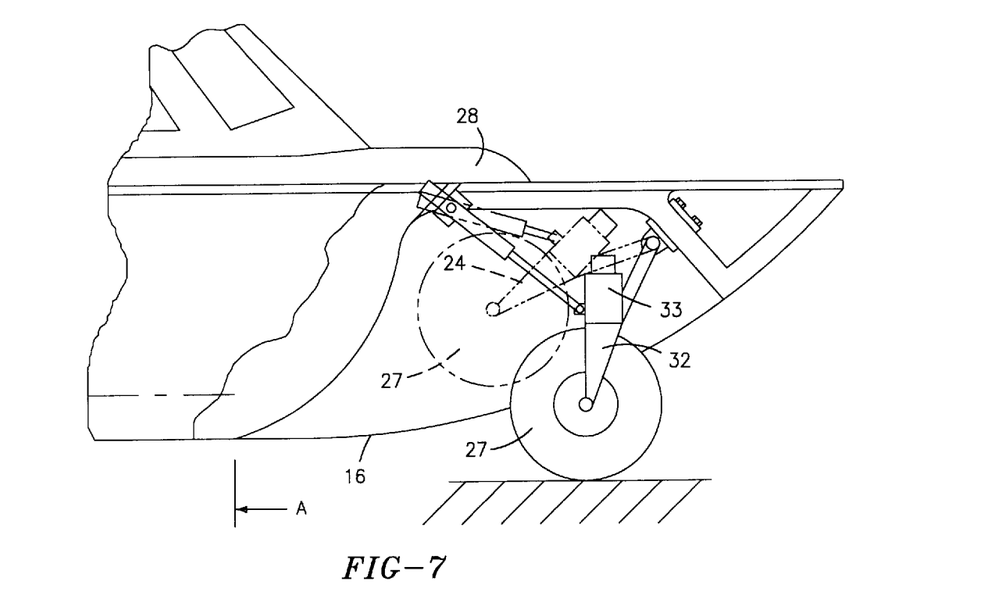
FIG. 7 is a side view of the bow portion of the craft with parts broken away to show the details of the forward wheel set.
Figure 8:
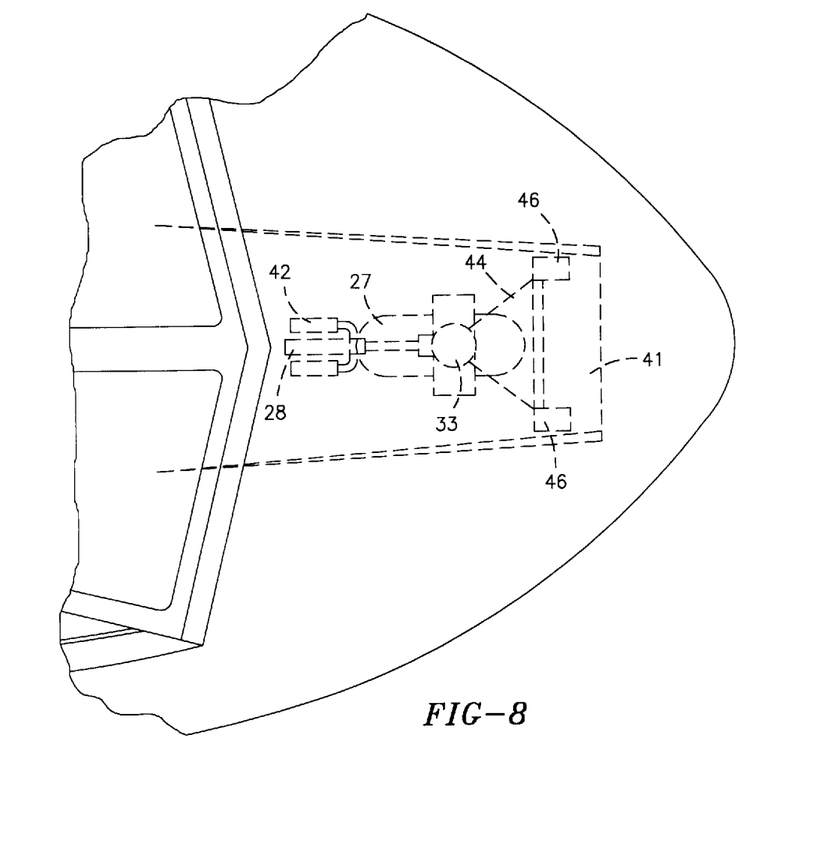
FIG. 8 is a plan view of the bow of the craft with portions of the deck broken away further showing details of the forward wheel set.

FIGS. 7 and 8 show the bow section of the hull 12 and the disposition of the forward wheel set mounted in the wheel well or wheel socket 41. As can be seen in FIGS. 7 and 8, the wheel 41 is located in the bow 16 forward of the primary surface engaging portion 13. The wheel well 41 has a bottom opening though which the wheel 27 can be moved between a retracted position (dotted lines in FIG. 7) when the craft is travelling on water and ice, and in a deployed position (solid lines in FIG. 7) when the craft is operating on land.

Wheel 27 is supported by a fork or yoke 32 and the fork and thus the wheel 27 are movable from the solid line (surface engaging) position to the dotted line position thereof under control of ram 28 mounted in trunnion 42. The fork 32, in turn, is pivotally mounted to the wheel well as at 46. The wheel 27 is further under control of power steering unit 33. Wheel support structure 44 is mounted pivotally to the wheel well 41 at 46.

Figure 9:
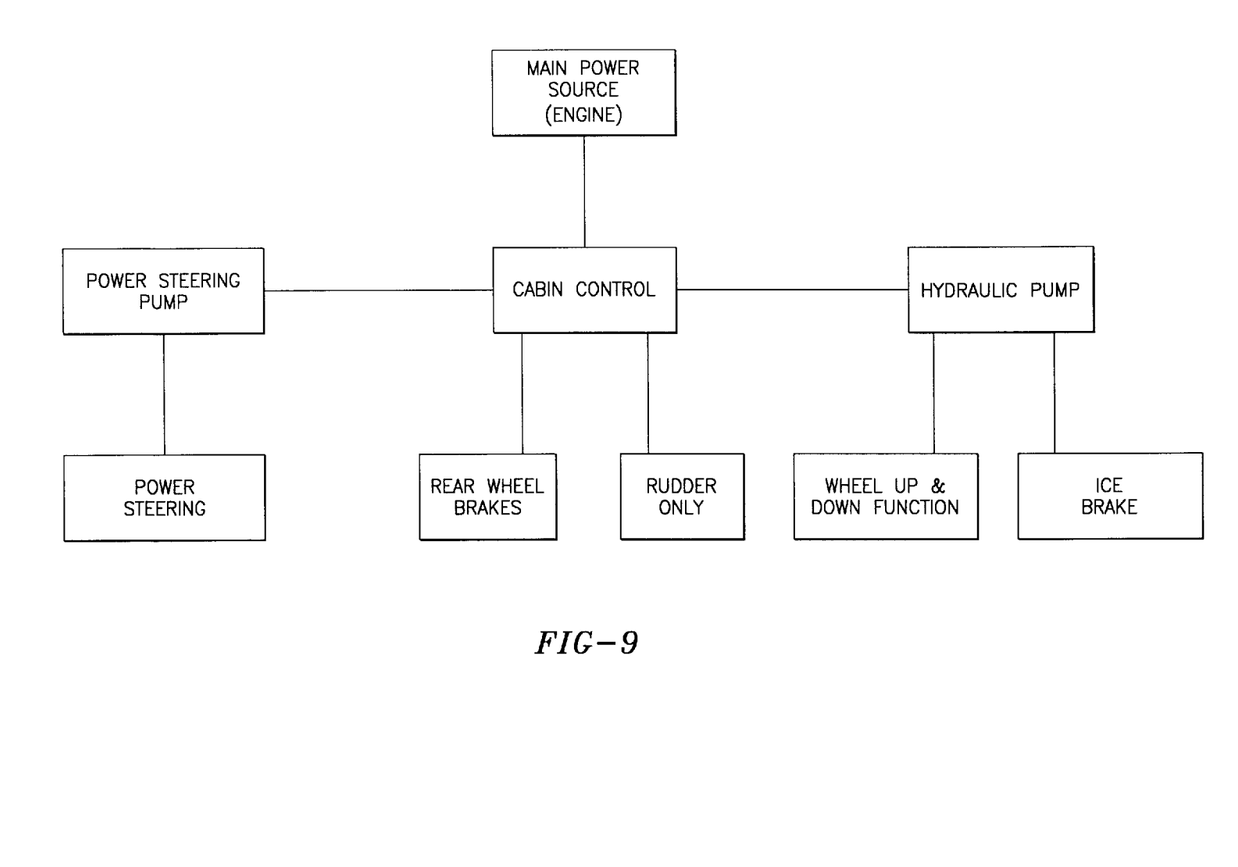
FIG. 9 is a schematic block diagram showing power source and the various operational units under control of the cabin instrument panel.

FIG. 9 is a block diagram of the power means for operating and controlling the various units of the craft.

While a hydraulic system is disclosed, it is entirely within the spirit and scope of the present invention to operate the various units electrically such as by electric motors, servo motors, etc. all of which are well known in the art.

Figure 10:
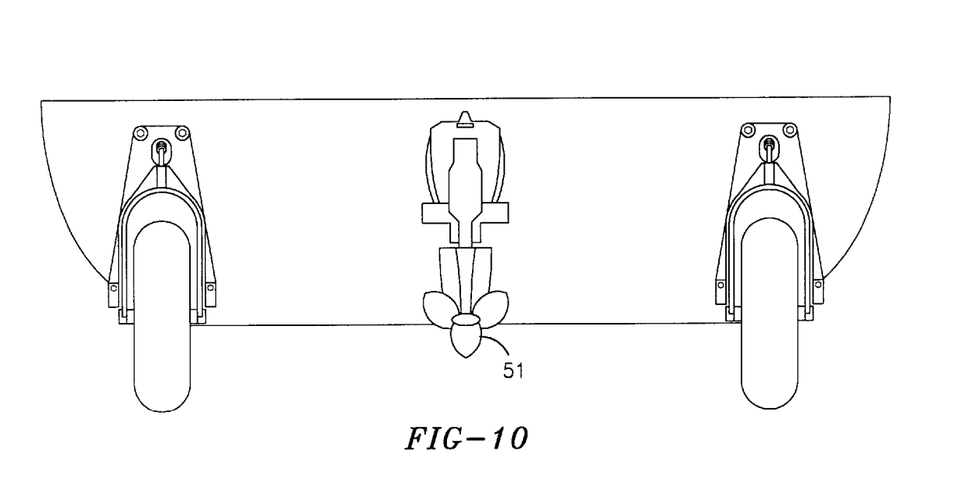
FIGS. 10 and 10A show an alternative embodiment of the invention wherein the craft is powered by an inboard or an outboard engine.
Figure 10A:
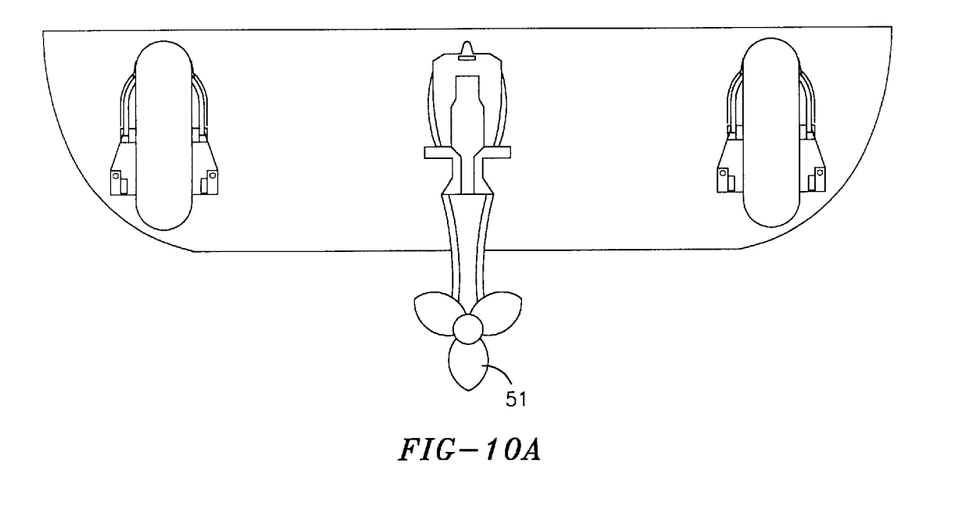
Figure 11:
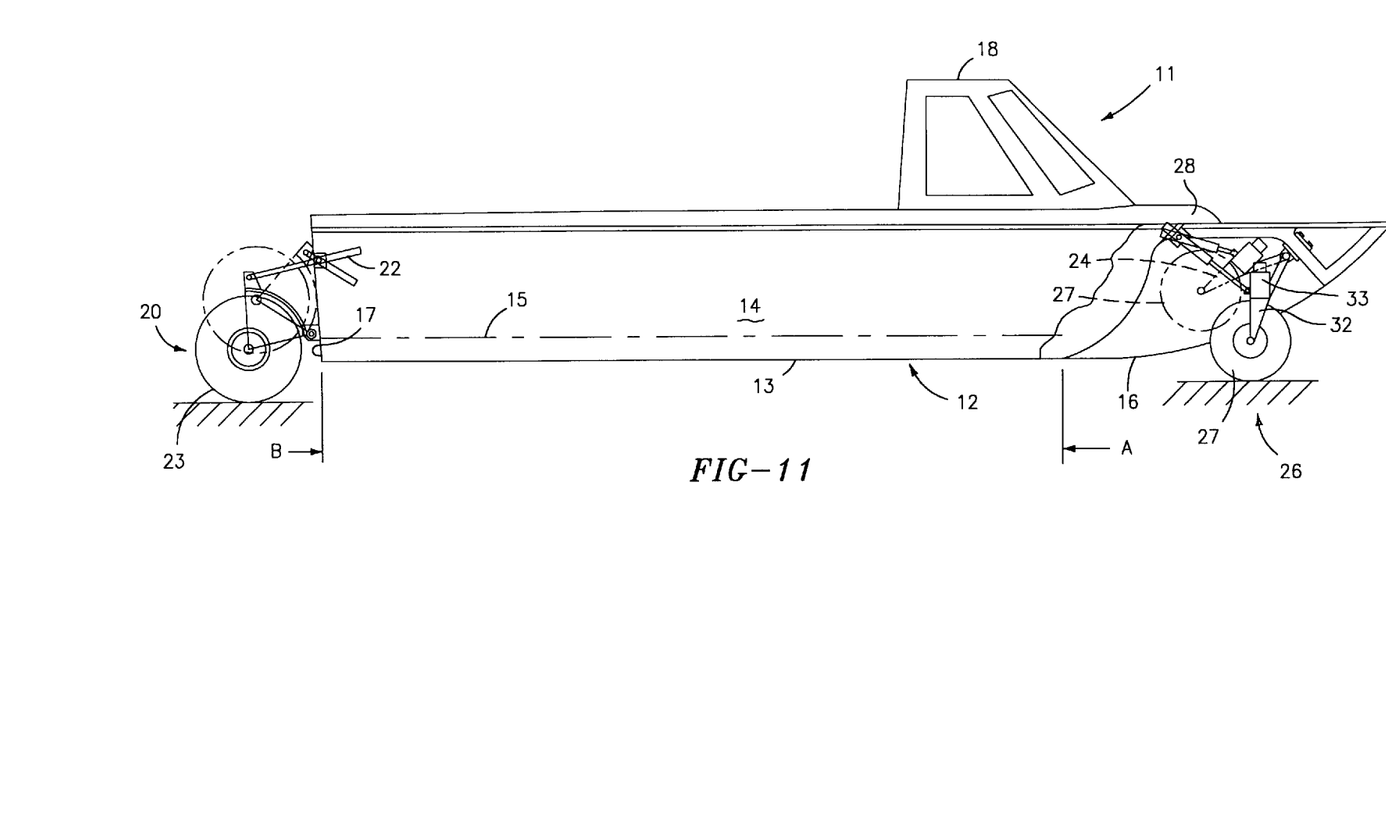
FIG. 11 is a side elevational of the alternative embodiment.

Referring to FIGS. 10, 10A and 11, an alternative embodiment of the craft is disclosed wherein a propeller 51 projects from the stern 52 powered by an inboard-outboard engine (not shown) in well known fashion. That is, the air fan is removed and the craft is powered by the propeller 51.

The propeller 51 is movable from the rest position of FIG. 10 to the operational position of FIG. 10A. In the FIG. 10 configuration, the bow and stern wheel sets are down in a surface engaging position. Correspondingly in the configuration of FIG. 10A the bow and stern wheel sets are up.

While the motive power in the alternative embodiment is derived from a propeller, it is entirely within the scope of the alternative embodiment that thrust be provided by a water jet.

The wheel sets are advanced outwardly and inwardly automatically under control of the hydraulic pump of FIG. 9 or manually by a hand operated hydraulic pump.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A multi-terrain vehicle for travel on water, land and ice comprising:

a hull having a bow, a stern, and a centerline extending from said bow to said stern;

a bow wheel mounted to the bow of said hull;

a wheel well in said bow for receiving said bow wheel when said vehicle travels in water and on ice;

said wheel well having a bottom opening through which said bow wheel is retracted;

said bow wheel being located above the waterline of said hull when retracted within said wheel well;

at least one retractable rear wheel mounted to and positioned rearwardly of the stern of said vehicle;

primary surface engaging means for supporting said vehicle when said vehicle is travelling in said water and on said ice, said primary engaging means comprising a hull portion having a smooth, continuous, uninterrupted surface extending from a point aft of said wheel well to a point substantially adjacent the stern of said vehicle;

said uninterrupted surface being located beneath said waterline; and said wheel well being positioned forward of said primary surface engaging means.

2. A multi-terrain vehicle according to claim 1 wherein said smooth, continuous, uninterrupted surface extends from a point immediately aft of said wheel well to a point substantially adjacent the stern of said vehicle.

3. The multi-terrain vehicle of claim 1 wherein said at least one rear wheel is pivotably mounted to said stern so as to enable said at least one rear wheel to move between a retracted position and a deployed position.

4. The multi-terrain vehicle of claim 3 wherein said at least one rear wheel is pivotable about an axis substantially perpendicular to said centerline.

5. The multi-terrain vehicle of claim 4 further comprising powered means for moving said at least one rear wheel between said retracted and deployed positions.

6. The multi-terrain vehicle of claim 1 wherein said bow wheel is pivotably mounted to said vehicle for movement between said retracted position and a deployed position wherein said bow wheel projects from said wheel well.

7. The multi-terrain vehicle of claim 6 further comprising powered means for moving said bow wheel between said deployed and retracted positions.

8. The multi-terrain vehicle of claim 1 further comprising:

said bow wheel being rotatable about a substantially vertical axis.

9. The multi-terrain vehicle of claim 1 further comprising:

at least one ice brake rotatably mounted to said stern.

10. The multi-terrain vehicle of claims 9 wherein said at least one ice brake comprises a plate with lugs.

11. The multi-terrain vehicle of claim 1 further comprising means for propelling said vehicle attached to said stern.

12. The multi-terrain vehicle of claim 11 wherein:

said propelling means comprises an air fan mounted to the stern of said hull for providing a propulsive force when the vehicle travels on water, ice and land; and said air fan being located above said waterline.

13. The multi-terrain vehicle of claim 12 further comprising rudder means adjacent said air fan for steering said vehicle.

14. The multi-terrain vehicle of claim 1 wherein said wheel well is contoured into said bow of said hull and remains open at all times during the operation of said vehicle.

15. The multi-terrain vehicle of claim 1 further comprising said at least one rear wheel being positioned above said waterline when in a retracted position.

16. A multi-terrain air boat comprising:

a hull;

said hull having a bow, a stern, and a centerline extending from said bow to said stern;

a wheel well contoured into the bow of said hull, said wheel well including an opening in a lower portion of said bow;

a bow wheel retractably mounted within said wheel well for movement through said opening between a deployed position when said air boat is travelling on land and a retracted position within said wheel well when said air boat travels on water and ice;

two rear wheels positioned rearwardly of and mounted to the stern of said hull;

each of said rear wheels being movable between a deployed position when said air boat is travelling on land and a retracted position when said air boat is travelling on water and ice;

an air fan mounted to the stern of said air boat for propelling said air boat on water, ice and land;

said air fan being positioned above the waterline of said hull;

rudder means for steering said air boat;

primary surface engaging means for supporting said air boat when said air boat is travelling on water and ice, said primary surface engaging means comprising a portion of said hull having a smooth, continuous, uninterrupted surface extending from a point on said hull immediately aft of said wheel well to a point substantially adjacent the stern of said air boat; and said uninterrupted surface being located beneath said waterline.

17. A multi-terrain craft comprising:

a primary surface engaging means acting as a load bearing means when said craft travels on water;

said primary surface engaging means comprising a hull portion having a defined waterline when said craft is in a body of water;

said hull portion extending from a point adjacent the bow of said craft to the stern of said craft;

said hull portion being substantially coextensive with said waterline and comprising a smooth, continuous, uninterrupted surface extending from said point to the stern having no discontinuities which increase friction and/or drag on said hull portion;

a secondary surface engaging means for engaging a solid surface operable independently of said primary surface engaging means; and said secondary surface engaging means comprising at least one wheel set mounted to and positioned rearwardly of the stern of said craft and moveable between a first position above the waterline and a second position at least partially below said waterlines;

said secondary surface engaging means further comprising a bow wheel; and said bow wheel being retractable through an opening in a lower portion of said bow into a wheel well located in said bow forward of said primary surface engaging means.

* * * * *